2,985,506
METHOD OF PRODUCING BARIUM TITANATE

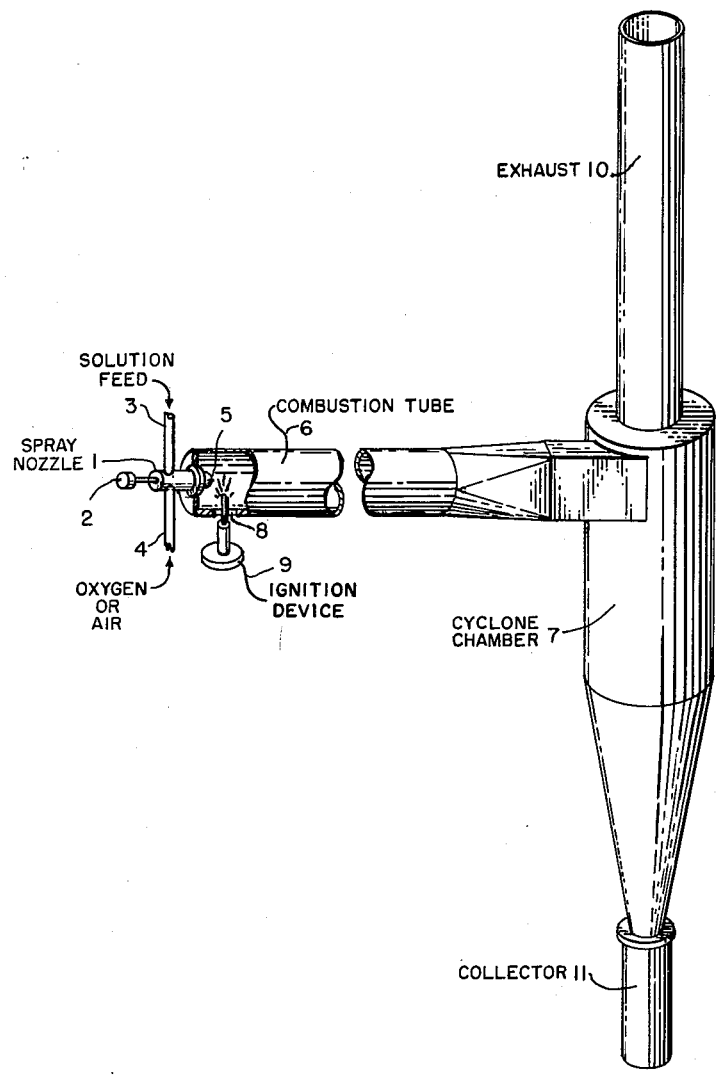

Sam Di Vita and Robert J. Fischer, West Long Branch, N.J., assignors to the United States of America as represented by the Secretary of the Army Filed Dec. 6, 1957, Ser. No. 701,277

1 Claim. (Cl. 23—51)

(Granted under Title 35, U.S. Code (1952), sec. 266)

The invention described herein may be manufactured and used by or for the Government for governmental purposes without the payment of any royalty thereon.

This invention relates to a method of producing extremely fine particles of barium titanate of highest compositional and structural purity and optimal homogeneity.

Barium titanate owes its great importance to the fact that its dielectric constant is about 100 times higher than that of conventional dielectric materials provided its compositional and structural purity is extremely high. The value of crystalline barium titanate bodies as used, for instance, in computer elements, magnetic amplifiers, memory devices, etc., depends on both the compositional and the structural purity of the barium titanate crystals. This purity will, in turn, depend on the purity of the raw materials used in manufacturing the barium titanate compound and on the particular methods of manufacture which determine the size, homogeneity, and the structural purity of the crystals.

It has been known to make barioum titanate by dry mixing barium carbonate and titanium carbonate or by dry mixing barium oxalate and titanium oxalate and then heating the dry mixtures of these compounds to temperatures high enough to bring about a solid state reaction yielding barium titanate. To obtain the desired small particle size these solid state reaction products have to be ground. However, small portions of the barium and titanium compounds may not have reacted with each other and may therefore be present as such in the finished product. The barium titanate thus obtained will therefore be contaminated with barium compounds and titanium compounds. Besides, it is rather difficult to get a homogeneous particle size solely by mechanical grinding operations. Therefore, the barium titanate particles made according to this known method are far from having a high degree of compositional and structural purity and do not exhibit a homogeneous particle size.

In patent application Serial No. 648,980, filed March 27, 1957, a method has been described of producing barium titanate of extremely high compositional and structural purity in the form of very small crystals of homogeneous size by mixing, in stoichiometric proportions, in an inert organic solvent barium alcoholate with titanium alcoholate and thereupon removing the solvent by evaporation at elevated temperature to bring about the reaction between barium and titanium and thus obtain ultra-pure barium titanate crystals.

We have now found that barium titanate of extremely small particle size and excellent dielectric properties and optimal homogeneity may be obtained by using the above described stoichiometric mixture of barium alcoholate and titanium alcoholate in an organic solvent and passing this mixture thru an atomizer together with a gas which will support combustion, such as oxygen or air. By igniting the mixture of sprayed solution and gas as it leaves the atomizer the heat of combustion will decompose the barium alcoholate and the titanium alcoholate setting free barium and titanium ions which will immediately react to form barium titanate crystals of extremely small particle size and optimal homogeneity. The volatile rests of the barium and titanium alcoholates will burn and go off.

The invention will become more apparent from the following description of a specific embodiment of the inventive process carried out in an apparatus shown in the accompanying drawing.

The drawing shows a perspective view, party broken away, of an "atomizer burner" apparatus which consists of an atomizer 1 regulated by a screw 2. The feed solution is introduced into the atomizer 1 thru pipe 3 while oxygen or air is introduced thru pipe 4. Both intakes may be regulated in known manner. The atomized solution leaving the orifice 5 of the atomizer 1 is sprayed into a combustion tube 6 attached tangentially to a cyclone chamber 7. An orifice 8 is provided in the combustion tube 6 to introduce an ignition device which may be a spark plug, a Bunsen burner, or a device similar to those used in oil burners. In the drawing the ignition device consists of a Bunsen burner 9 the flame of which is regulated in such a manner as to ignite the sprayed solution coming out of the orifiice 5 of the atomizer 1.

To start the process pure alcohol, e.g., ethyl alcohol and oxygen is fed into the atomizer, the spray is ignited and combustion is carried on until the tube becomes red hot. The temperature of the tube is measured by an optical pyrometer and by cutting down the flow of oxygen or by diluting it with air, the temperature is brought down to somewhat below 2700° F. The ignition device will not be needed at that temperature since the mixture ignites itself as long as the tube is sufficiently hot. The flow of pure alcohol is then replaced by a mixture consisting of the above mentioned solution of barium alcoholate and titanium alcoholate in an organic solvent. At the high temperature prevailing in the combustion tube the barium alcoholate and the titanium alcoholate will decompose and the free barium and titanium ions will react to form barium titanate crystals of extremely small but very homogeneous particle size.

These barium titanate crystals as formed in the combustion tube 6 are blown by the pressure of the spray together with the volatile combustion products into the cyclone chamber 7. The solid barium titanate crystals are swirled around in the chamber 7 and eventually separated from the gases by gravity, the crystals being collected in a collector 11 while the gases escape thru the exhaust 10. If necessary a series of cyclone chambers or other separators or suitable collection chambers may be used to separate the extremely small crystals from the gaseous particles of combustion.

By regulating the rate of flow and the concentration of the solution fed thru tube 3 and by regulating the rate of flow of the combustion gas thru tube 4 it becomes possible to control the temperature of the reaction in the combustion tube 6, the crystal form and the particle size of the formed barium titanate crystals. Crystals obtained at about 2700° F. are composed as shown by X-ray diffraction pattern of a mixture of 70% tetragonal and 30% hexagonal crystals; at 2650° F. the crystal mixture consists of about 80% tetragonal and 20% hexagonal. By decreasing the temperature further down to about 800° F. or even somewhat less, the amount of hexagonal crystals steadily decreases and the crystals become more and more cubic. The higher the percentage of cubic material the better the dielectric properties of the resulting product. The particle size of the barium titanate crystals may vary, depending upon the concentration of the solution from particles showing an average particle size of 0.2 micron down to a particle size of .01 micron and less.

The solution to be fed into the sprayer may consist of any appropriate mixture of stoichiometric proportions of barium alcholate and titanium alcoholate in a volatile organic solvent which is combustible but does not interfere with the solid state reaction between the barium ions and the titanium ions. The following mixtures may, for instance, be used:

(1) 9.29 gr. of barium isopropyl and 10.07 gr. of titanium isopropyl dissolved in 50 ml. of isopropyl alcohol.

(2) 10.31 gr. barium butylate and 12.06 gr. of titanium butylate dissolved in 50 ml. of butyl alcohol.

(3) 10.31 gr. of barium butylate and 10.07 gr. of titanium isopropyl dissolved in 50 ml. of butyl alcohol.

Instead of the above mentioned alcohols other appropriate organic solvents such as benzene, toluene, zylene, etc. may be used.

In order to prevent degradation of the crystal structure of barium titanate crystals it has been proposed to add small amounts, about 0.1% or less of lead, uranium or other substances having large molecules. These substances may be added as alcoholates to the mixture of barium and titanium alcoholates so that they will be included in the crystals as they are formed in the combustion tube. Other "foreign ions" can be formed into the structure of the barium titanate crystal by adding the soluble salts to the starting mixture; such "foreign ions" are, for instance, Cu, Sn, Tl, Ce, In, Fe, etc.

While there has been described what are at present considered to be preferred embodiments of the invention it will be obvious to those skilled in the art that various changes and modifications may be made therein without departing from the invention as defined in the appended claim.

What is claimed is:

Method of producing barium titanate crystals of highest compositional and structural purity and optimal homogeneity comprising spraying a solution of stoichiometric proportions of barium alcoholate and titanium alcoholate in an inert volatile organic solvent into a combustion tube together with a gas that supports combustion, said alcoholates of barium and titanium being selected from the group consisting of ethylates, propylates, isopropylates and butylates, said tube being heated to a temperature of about 800° F., allowing the barium alcoholate and the titanium alcoholate to decompose into free barium and titanium ions which at said temperature of about 800° F. will immediately react to form barium titanate crystals and immediately separating said barium titanate crystals from the gaseous reaction products.

References Cited in the file of this patent

UNITED STATES PATENTS

| | | |
|---|---|---|
| 1,843,012 | Bucherer | Jan. 26, 1932 |
| 2,166,221 | Patterson | July 18, 1939 |
| 2,441,613 | Balassa | May 18, 1948 |

OTHER REFERENCES

Perry: "Chemical Engineers' Handbook," 3rd ed. (1950), McGraw-Hill, pages 838–840 and 1573–1575.